(12) United States Patent  (10) Patent No.: US 9,137,955 B1
VanDusartz et al.  (45) Date of Patent: Sep. 22, 2015

(54) GRINDING DEVICE

(76) Inventors: Charlie VanDusartz, Hammond, WI (US); Jeffrey Watton, Chippewa Falls, WI (US)

( * ) Notice: Subject to any disclaimer, the term of this patent is extended or adjusted under 35 U.S.C. 154(b) by 1199 days.

(21) Appl. No.: 12/910,578

(22) Filed: Oct. 22, 2010

Related U.S. Application Data

(60) Provisional application No. 61/279,513, filed on Oct. 22, 2009.

(51) Int. Cl.
*A01G 23/06* (2006.01)
(52) U.S. Cl.
CPC .............. *A01G 23/067* (2013.01); *A01G 23/06* (2013.01)
(58) Field of Classification Search
CPC .......................... A01G 23/067; A01G 23/06
USPC ............ 144/334, 24.12, 35.1, 221, 220, 219, 144/225, 229; 241/92; 408/214, 223–225; 407/29.13, 33
See application file for complete search history.

(56) References Cited

U.S. PATENT DOCUMENTS

| 1,104,535 | A | 7/1914 | Moore |
| 1,164,659 | A | 12/1915 | Moore |
| 1,313,710 | A | 8/1919 | McKoy |
| 1,534,858 | A | 5/1921 | McKoy |
| 2,897,696 | A | 1/1956 | Tisserant |
| 3,564,945 | A | 2/1971 | Bradley |
| 4,214,617 | A | 7/1980 | McKenry |
| 4,697,625 | A | 10/1987 | Bolton |
| 4,783,914 | A | 11/1988 | Bowling |
| 5,360,041 | A | 11/1994 | Stevens |

OTHER PUBLICATIONS

Wikipedia; drill bit web page (partial page), Center bits, Jun. 28, 2013, Wikimedia Foundation, Inc., USA.

*Primary Examiner* — Shelley Self
*Assistant Examiner* — Matthew G Katcoff
(74) *Attorney, Agent, or Firm* — Anthony J. Bourget

(57) ABSTRACT

A grinding system including a pilot bit and a base having teeth extending from the base. The pilot may have a tapered cross-section, threads to control the rate at which it engages an object and a flute to facilitate the removal of material of an object. A method of using the device may include allowing the bit and the base to work together in a manner that the portions of the system engage an object at a similar rate.

1 Claim, 7 Drawing Sheets

GRINDING DEVICE

CROSS-REFERENCE TO RELATED APPLICATIONS

This application claims the benefit and priority, under 35 U.S.C. §119(e), of U.S. Provisional Patent Application Ser. No. 61/279,513, filed Oct. 22, 2009, and hereby incorporates that application by reference, in full.

BACKGROUND OF THE INVENTION

1. Field of the Invention

The present invention relates generally to grinding devices, and particularly to rotating grinding devices that are rotated through the power of an operator or a device to which the rotating grinding device is attached.

2. Background Information

Grinding devices are known for a variety of purposes. For example, grinding devices may be utilized for removing material in a manufacturing process to shape an article of manufacture, for transforming solid objects into small pieces capable of being easily removed or transported, or for other purposes.

One specific purpose for which grinding devices are used is for the purpose of tree stump removal. Grinding devices used for tree stump removal generally have rotating cutting blades that rotate about an axis and these cutting blades engage the tree stump while moving along the axis of rotation. These grinding devices most frequently either have an axis of rotation parallel to the direction of gravity or transverse thereto.

While the prior art has provided examples of grinding devices, and specifically tree stump grinding devices, there is always room for improvement.

SUMMARY OF THE INVENTION

Although grinding devices, specifically tree stump grinding devices, are known the inventors have realized deficiencies with such devices and have developed improvements thereon. For example, Applicants have realized that existing grinding devices moving along an axis substantially parallel to the direction of gravity suffer from the need for high levels of external force to grind an object. Moreover, Applicants have realized that existing grinding devices fail to provide a system that may self-limit the rate at which grinding is performed. Applicants have realized these and other deficiencies of the prior art grinding devices and have combined the below objectives in a novel manner to provide a grinding device that provides solutions to such deficiencies.

In accordance with an aspect of the invention, the device is directed toward a grinding system comprising a central shaft, a cutting bit, blade members, teeth connected to the blade members and a collar surrounding the blade members. Structurally, the cutting bit may be connected to an end of the shaft and the blade members may extend in a radial direction from the shaft to the collar.

In operation, an embodiment of the invention may include engaging the cutting bit of the grinding device with an object to be ground. The grinding device may be rotated and the cutting bit enters the object, which draws the teeth toward the object. Eventually, the teeth also engage the object and shave away material of the object as the device continues to engage the object.

An object of the invention is to provide a device that may be rotationally powered by a low powered machine through a reversible drive hydraulic motor.

An object of the invention is to provide a grinding device that has a constant grind-depth per rotation of grinding that is self-controlled by portions of the grinding device.

An object of the invention is to provide a grinding device that shaves material of an object to be ground, rather than chipping the material, so as to reduce projectiles resulting from the grinding of the object.

A further object of the invention is to provide a grinding device comprising a self-tapping pilot bit that allows for removal of material cut by the bit.

A further object of the invention is to provide features of the invention that are long lasting and may be replaced after wear and tear.

A further object of the invention is to provide a device that places reduced forces on features of the invention while the device engages a material to be ground.

A further object of the invention is to overcome the troubles of using low-powered equipment to grind stumps since such equipment typically does not have enough power to prevent stalling because of the "dive" experienced in cutting too big of a portion of the stump in a single rotation of the device.

A further object of the invention is to present a device that self-limits the amount of cut so that a lower power device (less rpm and less torque) can be used.

A further object of the invention is to reduce flying debris in a stump grinding operation which improves safety and clean-up.

A further object of the invention is to allow for use of light-weight maneuverable machinery for stump grinding operations to accommodate easier access as compared to heavy equipment.

The above summary of the present invention is not intended to describe each illustrated embodiment, aspect, or every implementation of the present invention. The figures and detailed description and claims that follow more particularly exemplify these and other embodiments and further aspects of the invention.

BRIEF DESCRIPTION OF THE DRAWINGS

The invention may be more completely understood in consideration of the following description of various embodiments of the invention in connection with the accompanying drawings, in which.

Figure 1:
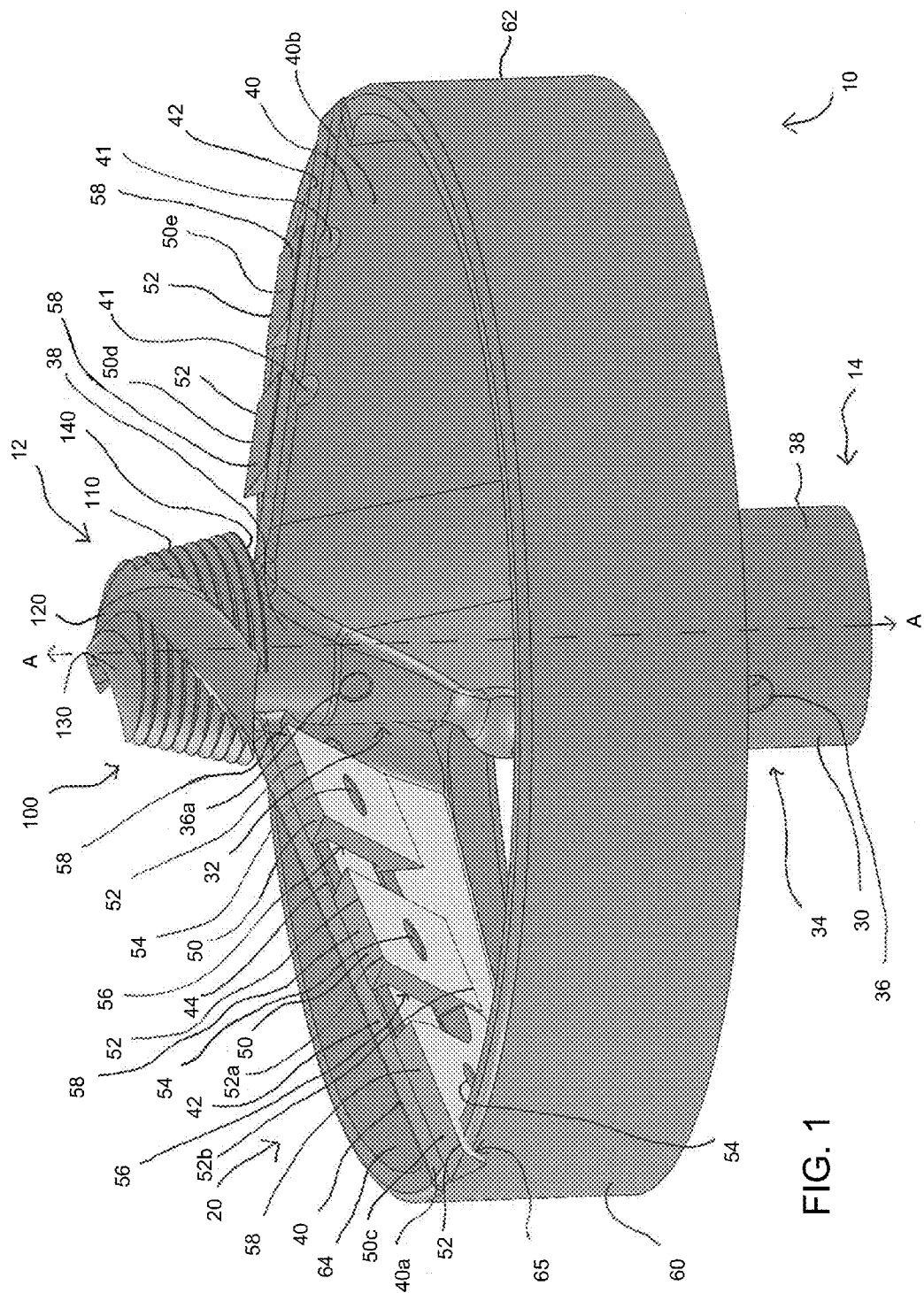
FIG. 1 is a perspective view of a grinding system in accordance with one aspect of the present invention.

While the invention is amenable to various modifications and alternative forms, specifics thereof have been shown by way of example in the drawings and will be described in detail. It should be understood, however, that the intention is not necessarily to limit the invention to the particular embodiments, aspects and features described. On the contrary, the intention is to cover all modifications, equivalents, and alternatives falling within the spirit and scope of the invention and as defined by the appended claims.

DETAILED DESCRIPTION OF THE INVENTION

Referring now to the Figures, grinding system 10, a rotationally operative implement member, comprises a base 20 and a bit 100. Generally, grinding system 10 may have a first end 12 and a second end 14, where first end 12 may include bit 100 and second end 14 may be adapted for attachment to a power shaft. Base 20 and bit 100 may take on any shape and size that facilitates rotational grinding in the direction of the axis of rotation. Base 20 may comprise a central shaft, blades 40, teeth 50 and a collar 60. Preferably central shaft is a central tube 30. Further, bit 100 may comprise a bit shaft 102 and a bit head 104.

Central tube 30 may be formed with an elongated concentric wall of substantially uniform thickness, or varying thickness, and central tube 30 may have a single exterior radius, or may have various exterior radii R. An exterior radius R may be the shortest distance from a point on a center axis A-A of central tube 30 to an exterior of central tube 30. For example, if central tube 30 is formed from a wall 38 having a uniform thickness, central tube 30 may have various exterior radii R to accommodate receiving inserts (e.g., a bit shaft 102 or a power shaft) of varying girths in a power shaft receiving hole 37 or a bit receiving hole 39, or both. Receiving holes 37, 39 may be axially spaced within tube 30 and may communicate with one another through central tube 30. That is, central tube 30 may be hollow. Alternatively, or additionally, central tube 30 may receive bit 100 or power shaft, or both, on an exterior thereof. In one aspect central shaft, as a central tube 30, may be tapered in that it may include a larger diameter portion comprising receiving hole 37 as compared to a smaller diameter portion comprising bit receiving hole 39.

Further, central tube 30 may have a first end 32 and second end 34, where each end may have a hole 36 extending through the wall 38 of central tube 30 for receiving a connection piece or connector. For example, hole 36a in first end 32 may receive a connector for connecting bit shaft 102 to central tube 30 and hole 36 in second end 34 may receive a connector for connecting a power shaft to central tube 30. Connectors may be any type of connectors, for example, connectors may be a bolt and nut connector, ball lock connector or another type of connector capable of making the required connection and taking on the stresses that result from grinding objects. Shear bolts may also be used as desired.

Base 20 may comprise a single blade 40 or a plurality of blades 40; for example, base 20 may have two blades 40 spaced about central tube 30. Each blade 40 may extend in a radial direction from central tube 30 to collar 60 and each blade 40 may extend around central tube 30 at least one hundred eighty degrees. Blades 40 may be oriented in a stepped or spiral manner with respect to central tube 30 and collar 60. Moreover, blades 40 may be integrally formed with central tube 30 or collar 60, or both, or may be connected to central tube 30 or collar 60 through any connection technique, or a combination of being integrally formed and connected. An example of a suitable connection technique may include welding. The system may also be made from a casting.

Figure 3:
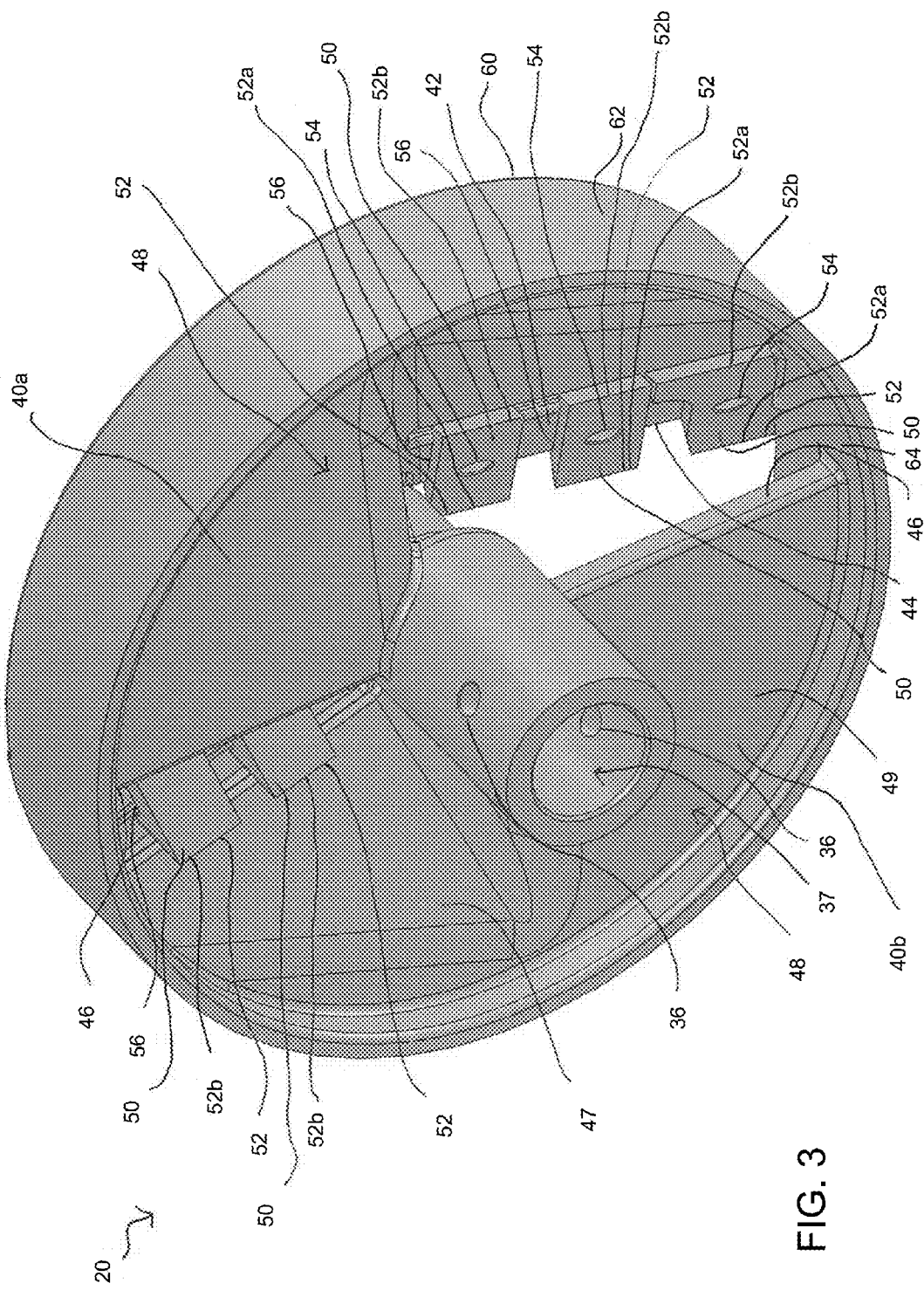
FIG. 3 is a perspective bottom view of the system of FIG. 1.

Blades 40 may comprise a blade end 44, a disposal end 46 and a carrier 48 connecting blade end 44 and disposal end 46. Further, blade 40 may have a beveled side 42 that terminates at blade end 44. Blade end 44, disposal end 46 and carrier 48 may extend from central tube 30 to collar 60 so as to form a solid blade 40. Carrier 48 may be curved or contain undulations between blade end 44 and disposal end 46. Carrier 48 assists in the removal of debris, such as wood chips, as system 10 rotates and cuts the material. Particularly, as system rotates, wood chips, for instance, will travel or be forced upwards along tooth surface 53 and onto carrier ramp portion 47 and carrier shelf portion 49. It may be appreciated that ramp portion 47 has a relatively steep orientation with respect to center axis A-A as compared to a relatively flat orientation of carrier shelf portion 49. While not shown, it may be appreciated that disposal end 46 may include a projection that projects upward from shelf portion 49 in a direction generally toward second end 34. Such a projection upward from shelf portion 49 would operate as a barrier to at least partially inhibit (or deflect) chips from easily falling off from shelf portion 49 toward the teeth 50 situated at blade end 44 of blade 40a. Ramp portion 47 and shelf portion 49 assist in clearing chips from system 10 and in assisting chips from returning to the region of teeth 50 once the chips have been removed from the stump or other matter. Shelf portion 49 is positioned relatively horizontal as compared to ramp portion 47. Shelf portion 49 is preferably connected along collar inner side 64 which provides additional strength and support to system 10. Disposal end 46 of a first blade 40a may overlap with blade end 44 or carrier 48, or both, of a second blade 40b. Blades 40 extend at least 180 degrees around central shaft or central tube 30, and preferably greater than 180 degrees. This overlap may be appreciated when viewed looking downward (or upward) along central shaft. In the event chips fall from disposal end 46 they tend to avoid falling on to or near cutting edge 52a of teeth 50 and instead would tend to fall toward a second cutting edge 52b (See FIG. 3) positioned rearward of cutting edge 52a. Moreover, due to rotation of system 10, and given the aforementioned overlap, the presence of debris falling onto cutting edge 52a is lessened.

Applicants appreciate that removal of debris is important to the operation of system 10 since the presence of debris may result in binding or otherwise inhibit efficient rotation of system 10. If debris were otherwise to compact within body 20, a greater force would be required to rotate system 10, thus making use of system 10 unworkable with light equipment such as with a Bobcat or other low-power or low RPM machines. Allowing for a self-limiting amount of debris to be cut from the stump will allow device 10 to continue cutting operation without interruption. Moreover, and because system 10 is designed to be used on machinery without the ability to apply a strong (or perhaps any or only minimal) force downward in the direction of the bit, the bit head 104 must remain self-tapping. Therefore further controlled action and self-limiting cutting is required; otherwise if too deep of a cut is taken by tooth 50, system 10 will lack power to continue rotation and will be unworkable except when affixed to large equipment having great rpm and torque; alternatively, if teeth 50 are not configured to cut depth enough, blades 40 (and particularly beveled sides 42 which do not include a cutting surface) will cause system to suspend on the stump without sufficient cutting depth which in turn will cause bit head to strip the threads that would otherwise be formed in the stump. Applicants recognize the importance of maintaining the cutting depth of tooth 50 (or teeth 50) to be substantially the same as the self-tapping rate of the bit head, especially in the present situation where lightweight equipment may be used in the operation. If there is a substantial mismatch, the system will either a) require too much torque to continue rotation (due to the fact that teeth 50 are cutting too deeply) or b) require too much downward force (due to the stripping of the self-tapping threads within the stump) to continue cutting. Such stripping of the threads would frustrate operation of system 10 which is designed to be self-tapping since the equipment to which system 10 is attached would lack the ability to exert downward force sufficient to maintain the cutting of stump.

Blade end 44 may form an angle C with a plane along line B-B, where the plane B-B is substantially transverse to central tube 30 and an axis of rotation A-A of base 20. Angle C may be any angle with respect to a plane along line B-B; for example, Angle C may be an acute angle. More specifically, and within the example, angle C is preferably about thirty-three degrees. The angling of blade end 44 assist in the maintaining of centering of system 10 during rotation as a teeth 50 adjacent to central axis, such as teeth 50a would engage a stump before a teeth 50 (such as in the case where a stump has been cut with a relatively horizontal surface for cutting). Having teeth 50 adjacent central axis engage before a more distal tooth 50 lessens the tendance for misalignment about the stump when teeth 50 engages the stump.

Blades 40 may have fastening holes 41 for receiving a tooth fastener or connector. Fastening holes 41 may extend through blades 40, including through a tooth ledge 43 that may be located on carrier 48 of blades 40. Tooth ledge 43 may extend from central tube 30 to collar 60 along blade 40 and parallel with blade end 44.

Figure 4:
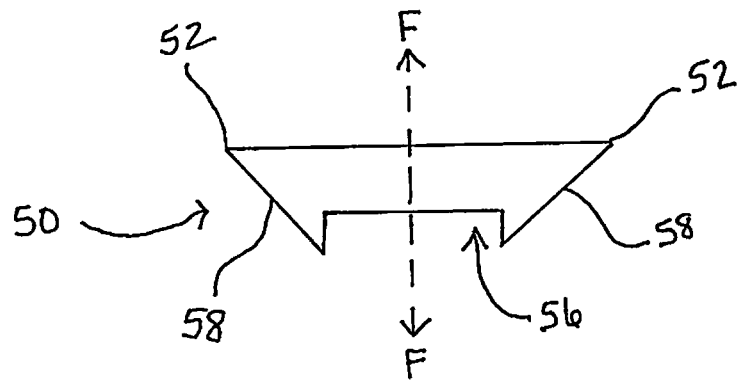
FIG. 4 is an elevation view of a component for use with the present system.
Figure 5:
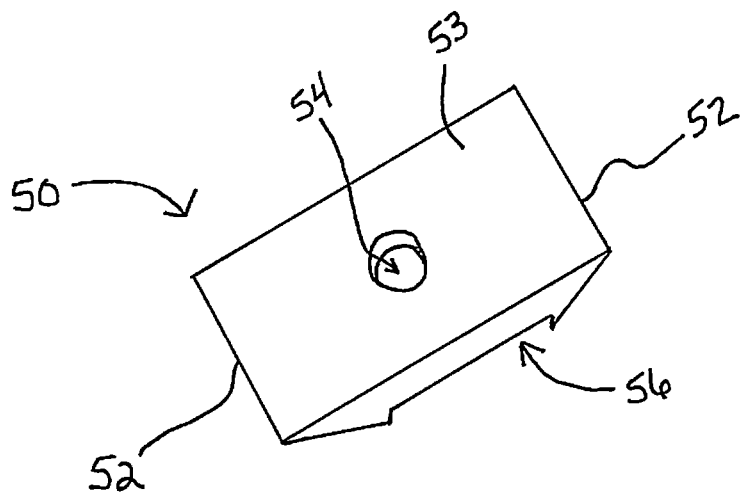
FIG. 5 is a perspective view of the component of FIG. 4.

Teeth 50 may be of any shape or size; for example, as shown in FIG. 4 and FIG. 5, teeth 50 may have at least one cutting edge 52 and a connector hole 54 extending through a center of tooth 50 and may be symmetrical about line F-F. Teeth 50 may have any number of cutting edges 52 and any number of connector holes 54, as desired. In the example, tooth 50 may have a first cutting edge 52a and a second cutting edge 52b at an opposite end of tooth 50 from first cutting edge 52a. Each cutting edge 52 may be formed at the end of a beveled side 58 of tooth 50. Further, tooth 50 may have an inset portion 56 of any depth and width through which connector hole 54 may extend. Inset portion 56 may be formed at any location within tooth 50; for example, when teeth 50 have two beveled sides 58, inset portion 56 may be formed between edges of beveled sides 58 opposite cutting edges 52. Moreover, inset portion 56 may engage tooth ledge 43 when tooth 50 is connected to blade 40.

Collar 60 may take on any shape or size; for example, collar 60 may be circular and concentric with respect to central tube 30 and may have a radius greater than a radius of central tube 30. Further, collar 60 may have a collar outer side 62 and a collar inner side 64, both of which may be substantially parallel to central axis A-A of tube 30. Alternatively, or additionally, collar sides 62, 64 may taper toward or away from bit 100, or may take on another shape suitable for facilitating the grinding of objects and maintaining a concentric relationship with respect to tube 30. Particularly, inner side 64 of collar 60 may be shaped in a manner that allows it to be formed with, or connected to, blade 40. Further, collar 60 may have a notch for receiving a portion of a tooth 50 extending a radial distance past inner side 64 and possibly outer side 64.

Figure 2:
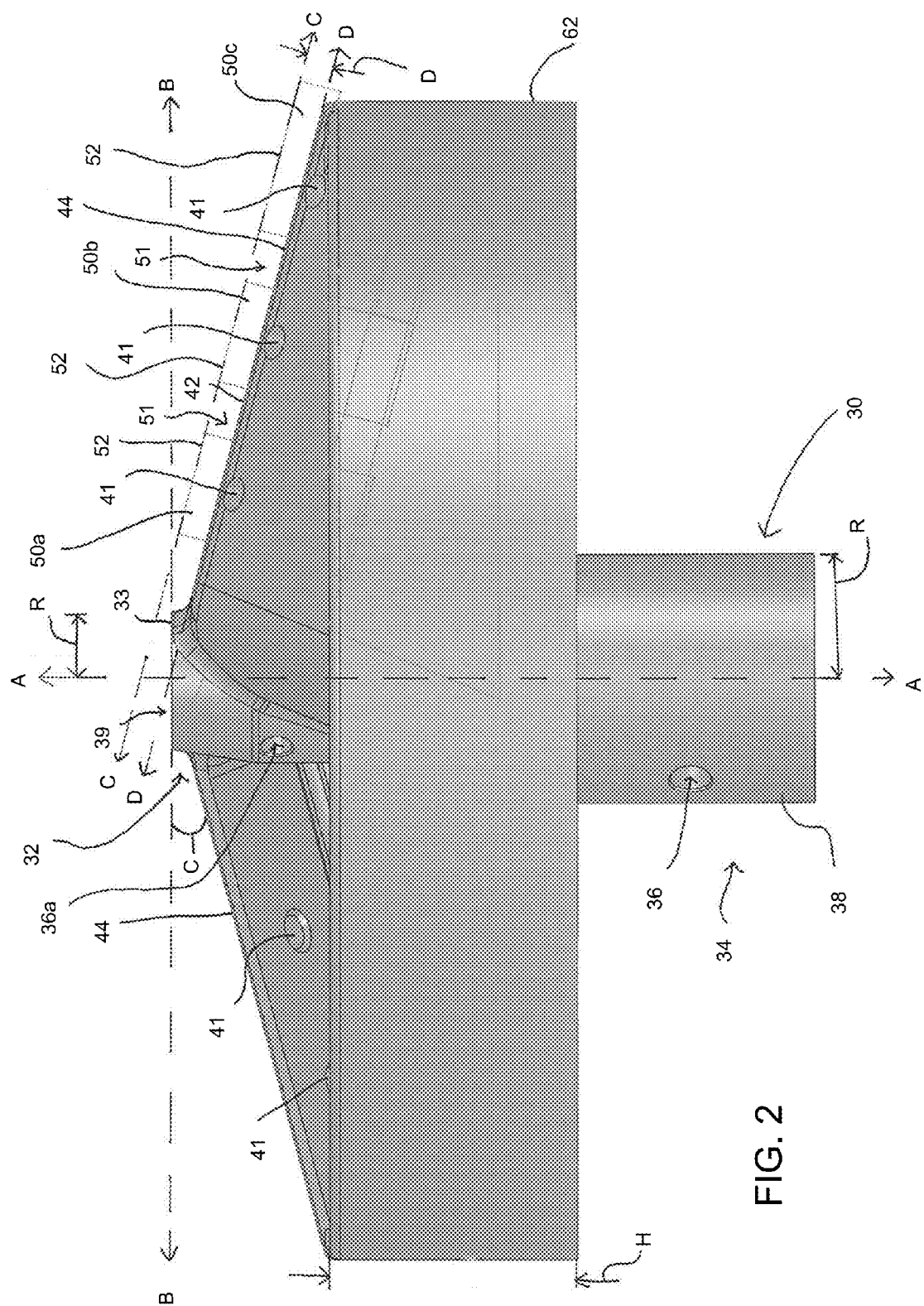
FIG. 2 is a partial elevation view of the system of FIG. 1 with aspects removed for illustrative purposes.
Figure 6:
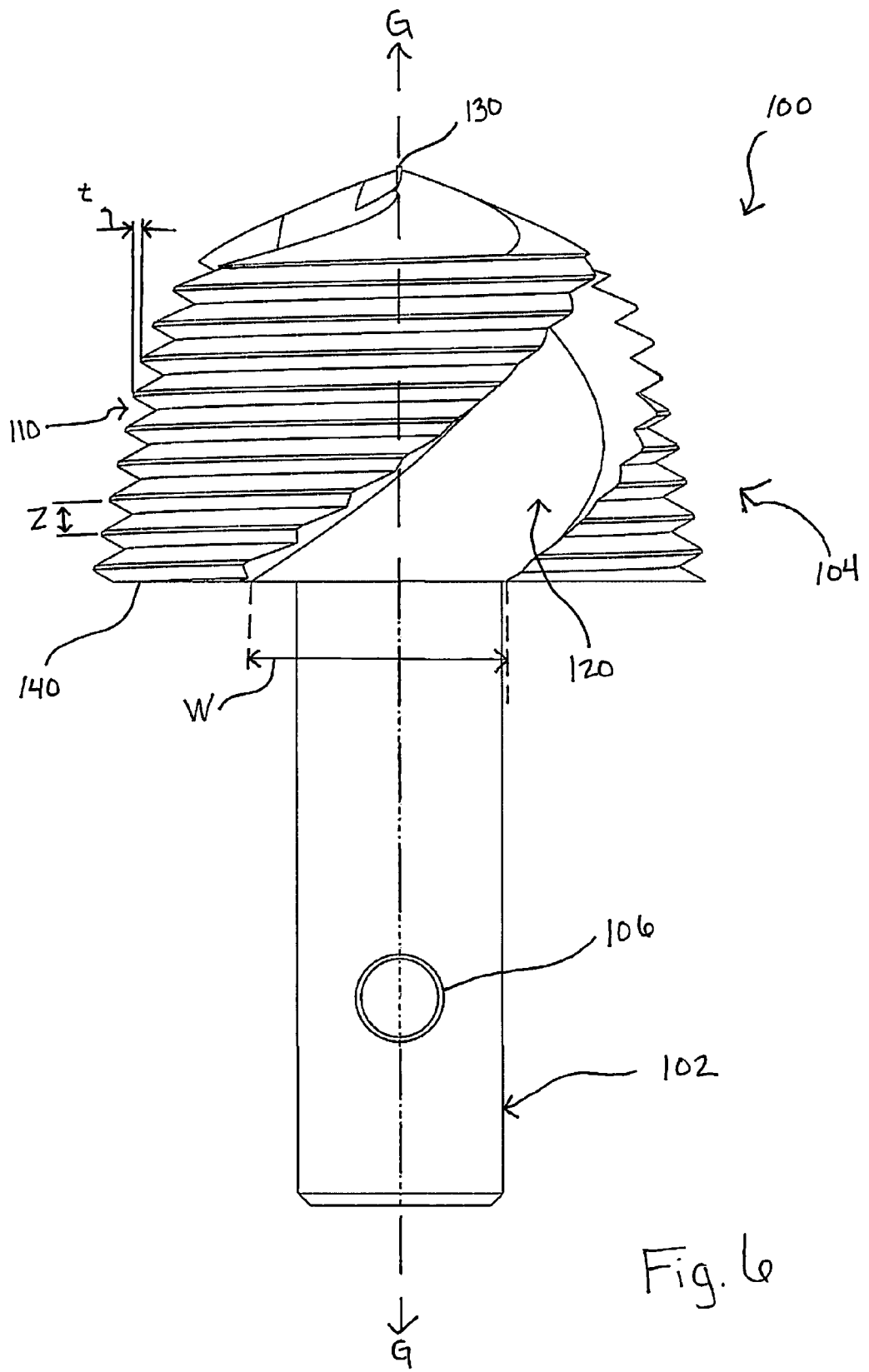
FIG. 6 is an elevation view of a further aspect of the present invention.

As generally shown in FIG. 6, bit 100 may be a pilot bit and may comprise a bit shaft 102 and a bit head 104 that are aligned about an axis along line G-G, where the axis along G-G may align with central axis about line A-A when bit 100 is connected with base 20. Bit shaft 102 and bit head 104 may be integrally formed or may be connected by any connection or fastening technique, including, but not limited to, a weld connection or a screw or bolt fastening. Bit shaft 102 may be elongated and may be solid or have an interior that is at least partially hollow. Bit shaft 102 may include a bit shaft hole 106 oriented substantially transverse to an axis of bit shaft 102 along line G-G. Hole 106 may be capable of being aligned with hole 36a (See, for instance, FIG. 1, FIG. 2) of first end 32 of central tube 30 when a ledge 140 of bit 100 abuts first end edge 33 (FIG. 2).

Bit head 104 of bit 100 may extend from a tip 130 to ledge 140 and bit head 104 may have a means for self tapping having the structure of a cross-section that tapers from ledge 140 inward toward tip 130; threads 110 having a rate of cut per rotation; and a flute 120. Self tapping may mean the ability to advance into an object when rotated while creating its own thread in the object in which it is being advanced. Preferably threads 110 comprise a single thread that runs the length of bit head 104. Threads may cause bit head 104 to travel a cut distance (shown generally as thread distance Z in FIG. 6) in the direction of an axis formed along line A-A per a single rotation of bit head 104. The cut distance may be equal to space or distance D (See FIG. 2). In addition, or as an alternative, to threads 110, head 104 may include flute 120 spirally extending around head 104 from ledge 140 to tip 130. Bit 100 may be inserted into tube 30 is such a manner so as to orientate flute 120 so that chips exit preferably onto the carrier shelf portion 49 (which is distal cutting edge 52). Two separate flutes 120 may be oriented on either side of head 104. Flute 120 may have a width W that tapers (i.e., gets narrower) as flute 120 extends from ledge 140 to tip 130. Further, flute 120 may have a depth that is constant as flute extends from ledge 140 to tip 130 or that depth may increase from ledge 140 to tip 130. The depth of flute 20 may also vary as it travels from ledge 140 to tip 130. Preferably, the space or volume presented along flute 120 is maintained, or increases, as the chips travels from the tip 130 to the ledge 14; for instance, as flute 120 gets wider and/or deeper as it spirals from tip 130 to ledge 140, the volume or space within flute 120 at least remains constant and preferably increases to accommodate for the mass of chips or debris that is cut from the stump or other object. Steadily increasing the volume allows for chips to be removed without bunching or clogging. Applicants appreciate that without an expanding flute the new chips may get stuck in the flute and frustrate the cutting and self-threading operation. If the self-treading feature is compromised, bit 100 will not function properly and instead strip the threads that it has previously cut or created within the stump. In such case the equipment used to power the system would otherwise lack enough power to continue pushing downward against the stump to have it re-threaded so that the teeth can cut the stump. Applicants appreciate that the tapering of head 104 from ledge 140 to tip 130 also allows for the self-tapping into a stump. Applicants have also found that having a particular taper (designated with arrow "t" in FIG. 6) to thread distance Z accommodates for self-tapping without stripping resulting threads within a stump. Preferably tapper "t" is consistent from one thread level to the next thread level. Applicants also appreciate that the angle or pitch of the threads may also influence the self-tapping and counter-threading of the stump, and the thread angle generally shown in FIG. 6 is one example.

In operation, bit 100 may be connected with base 20 by connecting bit shaft 102 with (e.g., inserting bit shaft 102 into) first end 32 of central tube 30, where bit shaft 102 may be releasably secured to first end 32 of central tube 30 by placing a connector through holes 36a and bit shaft hole 106. After bit 100 has been connected to base 20, a portion of ledge 140 adjacent a closest tooth 50 may be located between line C-C defining a plane of cutting edges 52 and line D-D defining a plane of blade end 44 of a blade 40 to which teeth 50 having cutting edges 52 defining line C-C are connected. Further, a power shaft may be connected with (e.g., inserted into) second end 34 of central shaft such as central tube 30, where power shaft may be releasably secured to second 34 of central tube 30 by placing a connector through holes 36 and holes of the power shaft.

In addition to connecting bit 100 and power shaft to base 20, it may be necessary to connect teeth 50 to blades 40. As discussed above, teeth 50 may connect to blades 40 in any fastening manner. For example, there may be two blades 40, where first blade 40a comprises three fastening holes 41 and a second blade 40b comprises two fastening holes 41. In this example, a connector may be placed through connector holes 54 of teeth 50 and through fastening hole 41 and the connector along with teeth 50 may be secured in place by a nut or other fastener communicating with blade 40 and the connector.

Once connected, teeth 50 may overlap blade 40, but may have a portion that extends beyond blade end 44. A portion of teeth 50 extending from blade end 44 may include cutting edge 52 and beveled side 58. Cutting edges 52 may extend a particular space or distance D from blade end 44, where distance D is defined by a space between a plane along line C-C and a parallel plane along line D-D. For example, distance D may equal one-eighth of an inch (⅛"). Moreover, distance D may equal a distance along central axis of line A-A that bit 100 travels in a single revolution when bit 100 has engaged an object. In an example, if bit 100 travels a distance Z of one-eighth an inch (⅛") per revolution, distance D may also equal one-eighth of an inch (⅛"). Preferably, the distance or space D will match (or at least substantially match) the travel distance Z resulting from a single revolution of bit 100.

Further, teeth 50 may extend the complete radial distance of blade 40 from central tube 30 to collar 60, and beyond, or teeth 50 may be spaced along blade 40 so as to be located at distinct radial distances from central tube 30. A gap, such as gap 51 may exist between adjacent teeth 50, such as between adjacent teeth 50a, 50b, 50c, for instance. Radial locations of teeth 50 along blade ends 44 may be staggered, and teeth 50 at radial locations on a first blade 40a may overlap radial locations of teeth 50 on a second blade 40b. Preferably no two teeth are located at identical radial locations along blade ends 44, and are preferably radially staggered with respect to central axis. Preferably teeth 50 which are positioned on blade 40b are staggered with respect to 50 which are positioned on blade 40a. Preferably teeth 50 are staggered so that they correspond with or align with opposing gaps 51. For example, teeth 50d, 50e are preferably radially aligned on blade 40b to match gaps 51, 51 situated between teeth 50a, 50b, and 50c aligned on blade 40a. Blade end 44, in the instances where gaps 51 are present, will contact a stump and "bottom-out" the distance or depth at which system 10 will cut. The blade end 44 at the gap locations 51 does not include a cutting edge so further cutting or downward motion is prevented. The abutment of end 44 against the stump prevents teeth 50 from further downward cutting or "diving" which teeth 50 would otherwise naturally tend to do. Yet further, a means for self-limiting a cutting depth or length D may comprise gap 51 between teeth 50 connected to blades 40 extending from central tube 30 and the distance in the gap 51 between a cutting plane C-C defined by cutting edges 52a and a blade plane D-D defined by blade ends 44.

As system 10 rotates, tooth 50, such as tooth 50d or 50e, located on blade 40b, will cut the stump at the region previously passed by blade end 44. Likewise, tooth 50, such as tooth 50b located on blade 40a, will cut the stump at the region of gap 51 previously passed by blade end 44 situated on blade 40b. The beveled side 42 will continue to ride along the stump without cutting the stump in the locations of the gaps 51 and thus allow for the self-limiting control of the depth of cut, such as a depth of length D. System 10 is a two stage cutting system in that bit 100 will cut a stump initially and then teeth 50 will subsequently cut stump. This two stage system is also self-limiting in the depth of cut that can be made by the bit 100 which is dependent upon thread distance Z together with the self-limiting depth of cut of teeth 50 which is dependent upon depth or space D.

Further, a tooth 50, such as tooth 50c for instance, may extend past collar outer side 62. The tooth 50 extending past collar edge 62 may be received by a notch 65 in collar 60. Extending a tooth or cutter beyond the circumference of collar allows for base 20 and the system 10 to continue downward motion of cutting into a stump or other material to be cut or grinded. Tooth 50 may extend outward from collar outer side 62 any desired distance; in the example the tooth preferably extends about ⅛ of an inch. Collar 60 also has a height H. As collar 60 submerges within a stump or other material the outer side 62, having height H assists with continued and further alignment of system 10 so that system 10 continues cutting in a direction preferably downward or along a path parallel to Axis A-A. Collar 60 provides strength and support to system 10. In one aspect collar 60 may have a diameter of about 14 inches, and may vary significantly depending on the power and size of the vehicle or equipment to which the device attaches.

Figure 7:
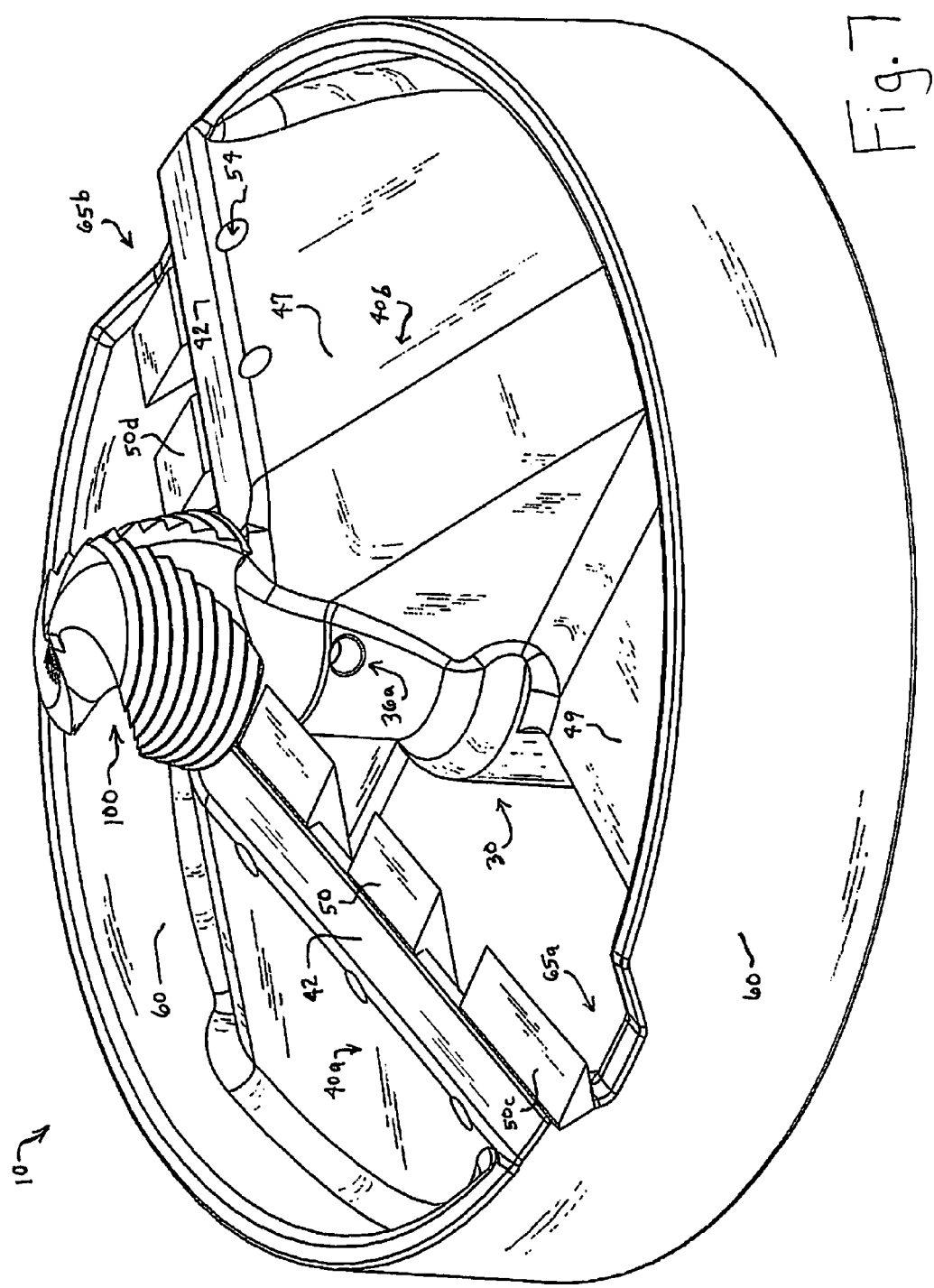
FIG. 7 is a perspective view of a grinding system in accordance with a further aspect of the present invention.

Collar 60 preferably includes extended notches 65a, 65b as generally shown in FIG. 7. Extended notches 65a, 65b accommodate use of tooth 50, such as tooth 50c which has a portion that extends past the circumference of collar 60. Extended notch 65a allows for insertion of tooth 50 having various lengths. It may be appreciated that a longer length tooth 50 may result in a greater space or depth D. A bit 100 having a corresponding thread distance Z is preferably used to match depth D. Preferably extended notches 65a, 65b appear adjacent respective blades 40 and beveled sides 42. Extended notches allow a fabricator an option of placing teeth upon blades 40. In one aspect, a fabricator may choose to place three teeth 50, for instance, on blade 40a; in an alternative aspect a fabricator may wish to place three teeth 50, for instance, on blade 40b. Having extended notches positioned on either side of collar 60 allows for such alternatives placement. A fabricator may then also select where to position connector holes 54 (to accommodate two teeth, three teeth, or some other number of teeth or alternative combination of teeth on blade 40) in order to assure teeth 50 are staggered radially from center shaft.

Once the various portions of grinding system 10 have been connected or formed, or both, system 10 may be used to grind an object. For example, system 10 may be utilized for grinding stumps. If a power shaft is connected to second end 34, the power shaft may be connected to a reversible drive hydraulic motor 210 of a front-loader or skid-loader 200 (e.g., a BOB-CATS) via hydraulic power lines 215. Such a hydraulic motor may have limited power, which may limit the speed at which it is capable of rotating system 10 and the force that may be applied to system 10. System 10 may be particularly adapted for use with such a limited power device because bit threads 110 and flute 120 may draw system toward and through an object to be ground. Further, to prevent grinding the object at a rate faster than the bit is penetrating the object and to avoid stalling system 10, the distance between cutting edge 52 and blade end 44 may limit the rate at which teeth 50 shave the object when teeth 50 are staggered about blades 40a, 40b.

A self-tapping pilot bit, such as bit 100 used in conjunction with self-limiting cutting teeth 50 (self-limiting in that they are limited in the depth of cut) allows for system 10 to efficiently operate in conjunction with all types of equipment to be used for grinding a stump. While such system 10 may be used in conjunction with conventional heavy equipment (such as with skid steers, backhoes, tractors, and other large-scale equipment having relatively great torque power and/or great hydraulic thrust and great gross vehicle weight (such as equipment weighing about 7,000 lbs. to over 80,000 lbs., and so as to not tip over while exerting a downward pressure to grind out a stump, or so as to have enough downward force to enable cutting; or so as to power the rotation in the event of cutting relatively deeply into a stump)), system 10 is surprisingly useful in conjunction with light-weight equipment such as Bobcats, four-wheelers, lawn mowers, walk-behind devices, and other equipment having low gross vehicle weight and/or low torque power and/or both. In one aspect, such as where system 10 includes a device with a collar 60 of about 14 inches in diameter, system 10 may be used in conjunction with an engine having minimal torque (i.e., torque of less than about 2100 ft. lbs.). Smaller diameter devices may also be used to fit equipment that has even less torque power, and larger diameter devices can be used with equipment that has greater torque power. A requirement for high power torque may be avoided since the depth of bite is self-limiting, thus reducing the amount of chips or depris that could clog or bind the system 10 from rotation; the matching of the self-tapping thread distance Z with the depth of cut D also minimizes stripping of threads formed within the stump or other material so that self-tapping may progress without applying heavy downward force upon stump. Thus, equipment having relatively light gross weight, i.e., small tractors, loaders and skid steers having about 5,000 lbs. of gross vehicle weight, or even walk-behind equipment of 3,000 lbs. or less, for instance, can be easily maneuvered to a backyard or other hard to reach area and still be able to accomplish a stump removal despite the relative lack of downward force that may be applied by the vehicle. Combining the anti-stripping features with the anti-binding features allows the present system 10 widespread application for economical use in conjunction with both lightweight and heavyweight equipment. While not limited thereto, equipment used to power system 10 may include equipment that has a hydraulic motor (with or without reverse capability).

Use of the system 10 in conjunction with lightweight equipment has the added benefit of safety and flexibility. Particularly, high speed and high torque machines are relatively more dangerous in many respects. In some instances such machines will cause chips or debris to be projected well beyond the perimeter of a stump or throw debris about the area. The heavy equipment is also noisy and cannot be easily maneuvered about terrain or between houses, trees or other objects to gain access to the stump to be cut.

Figure 8:
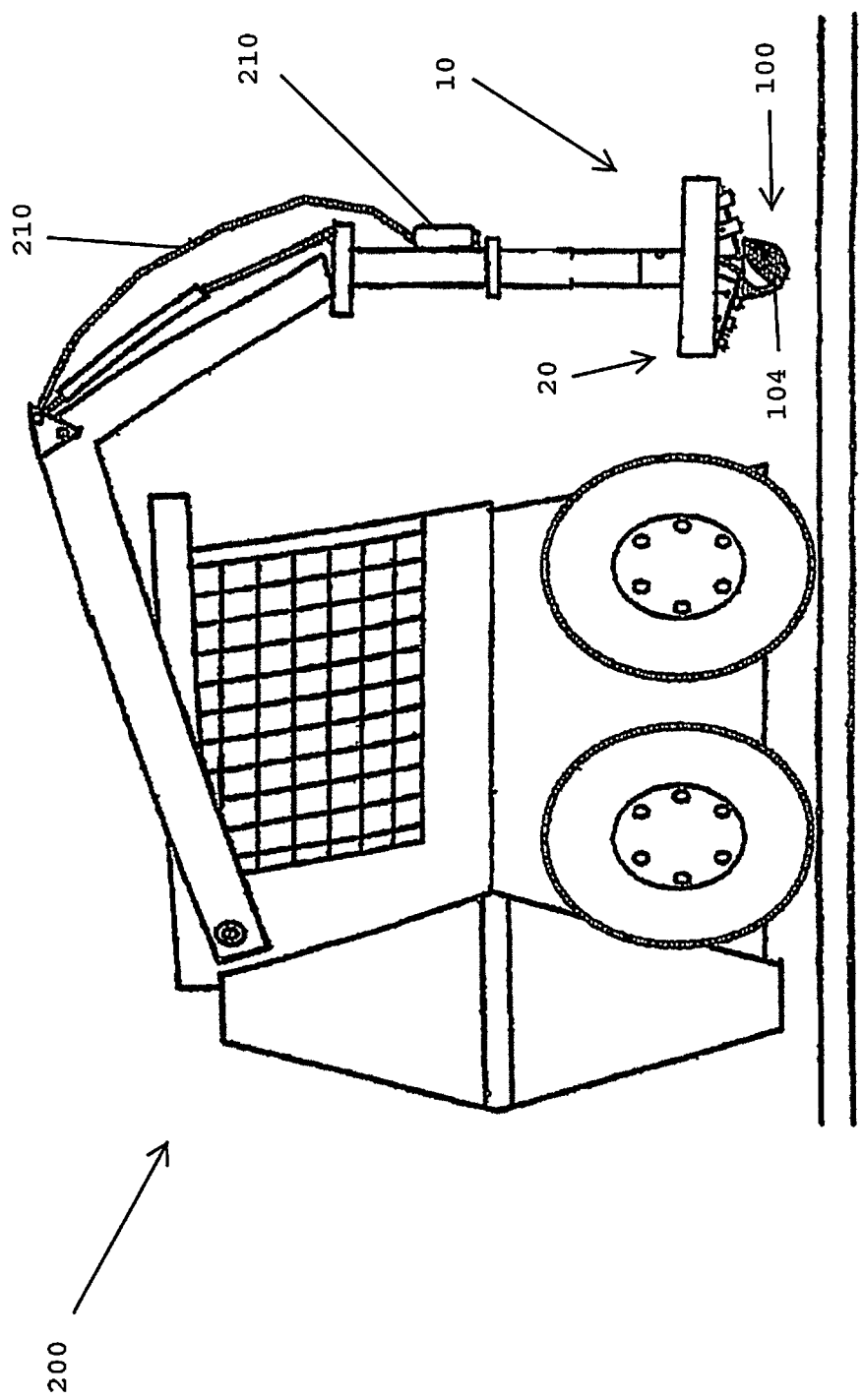
FIG. 8 is a side view of a grinding system in accordance with one aspect of the invention, where the grinding system is attached to a powered machine.

As seen in FIG. 8 one example of a lightweight vehicle 200 is shown with system 10 attached. A hydraulic motor 210, for example, in conjunction with hydraulic line is used to rotate system 10 having bit 100.

A method of cutting or grinding material such as a stump, or removal of at least a portion of a stump includes joining a grinding system such as system 10 with a piece of equipment capable of rotating the system 10. A relatively light-weight vehicle or equipment such as a Bobcat or other low gross vehicle weight machine may be used and still achieve desired results. System 10 may also be used to cut or grind materials or debris other than stumps.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise specifically indicated. While the particular GRINDING DEVICE as herein shown and described in detail is fully capable of attaining the above-described aspects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. A grinding device comprising:
   a central shaft having a first end and a second end;
   a collar concentrically spaced from said central shaft;
   a first blade extending from said central shaft to said collar;
   a second blade extending from said central shaft to said collar;
   a bit head operatively connected to said first end of said central shaft, and where said bit head has a tapered and a threaded exterior,
   said first blade and said second blade comprising:
   a blade end;
   a disposal end; and
   a carrier extending from said blade end to said disposal end, and
   where said first blade extends at least one hundred eighty degrees around said central shaft.

* * * * *